US006185430B1

(12) United States Patent
Yee et al.

(10) Patent No.: US 6,185,430 B1
(45) Date of Patent: *Feb. 6, 2001

(54) VOICE CALL GROUP FUNCTION FOR A SATELLITE BASED AIR TRAFFIC CONTROL SYSTEM

(75) Inventors: David Moon Yee, Scottsdale; Robert Henry Bickley, Paradise Valley; Philip John Zucarelli, Glendale; Theodore Woolley Keller; Jeffrey S. Osman, both of Scottsdale; Randall K. Derr, Phoenix, all of AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/979,798

(22) Filed: Nov. 26, 1997

(51) Int. Cl.[7] ..................................................... H04B 7/00
(52) U.S. Cl. .................. 455/519; 455/12.1; 455/428; 455/430; 455/431; 455/408; 379/184; 379/185; 379/187
(58) Field of Search .................... 455/518, 519, 455/12.1, 13.1, 13.2, 426, 427, 428, 430, 431, 406, 407, 408, 462, 463, 464; 379/114, 134, 177–187, 1

(56) References Cited

U.S. PATENT DOCUMENTS

| | | | |
|---|---|---|---|
| 4,723,264 | * 2/1988 | Sasuta et al. | 455/410 |
| 5,099,245 | * 3/1992 | Sagey | 342/357.01 |
| 5,404,571 | * 4/1995 | Makowski | 370/337 |
| 5,410,728 | * 4/1995 | Bertiger et al. | 455/13.1 |
| 5,483,575 | * 1/1996 | Zdanowski et al. | 455/508 |
| 5,523,997 | * 6/1996 | Bishop, Jr. | 370/54 |
| 5,627,546 | * 5/1997 | Crow | 342/352 |
| 5,712,908 | * 1/1998 | Brinkman et al. | 379/119 |
| 5,717,830 | * 2/1998 | Sigler et al. | 455/426 |
| 5,786,773 | * 7/1998 | Murphy | 340/947 |
| 5,828,952 | * 10/1998 | Sawyer | 455/427 |
| 5,890,679 | * 1/1999 | Chethik | 244/158 R |
| 5,926,745 | * 1/1999 | Threadgill et al. | 455/12.1 |
| 5,991,598 | * 11/1999 | Nawata | 455/13.1 |
| 6,009,306 | * 12/1999 | Hargis | 455/12.1 |

OTHER PUBLICATIONS

Reshetnev, M.; Cheremisin, V.; Karnaukhov, V.; Tchmykh, M.; Krokhov, S.; Kosenko, V.; Chebotarev, V.; Shakleyin, P.; Puchkarev, V. "Data transmission space system for air traffic control in Russia" Satellite Communications, 1994. ICSC'94., Proceedings,.of, Dec. 1994.*

Galati, G.; Perrotta, G.; Di Girolamo, S.; Mura, R. "Space-based SSR constellation for global air traffic control" Aerospace and Electronic Systems, IEEE Transactions on. vol. 32 3, Jul. 1996, pp. 1088–1106.*

(List continued on next page.)

Primary Examiner—Dwayne D. Bost
Assistant Examiner—Charles Craver
(74) Attorney, Agent, or Firm—Bradley J. Botsch

(57) ABSTRACT

Voice call group functionality is provided in a satellite based air traffic control system to allow air traffic controllers and pilots of one or more aircraft to establish and maintain voice communication over a group call. A pilot of an aircraft may maintain voice communication with the same air traffic controller the entire duration of the flight over the entire globe. Voice communication between the pilot of an aircraft may be handed off from one air traffic controller to another by switching voice call groups. The voice call group functionality allows an air traffic controller to communicate simultaneously with pilots of different aircraft, and also allows pilots of different aircraft to communicate with each other.

25 Claims, 8 Drawing Sheets

OTHER PUBLICATIONS

Ryan, F.R. "Potential for a greater satellite technology role in aeronautical safety communications" Satellite Distress and Safety Systems, IEE Colloquium on, 1993, pp. 7/1–7/3, Dec. 1993.*

Brandon, W.T. "Cockpit vision: enhanced communications with aircraft pilots via satellite" Satellite Communications—ECSC—3, 1993., 3rd European Conference on, 1993, pp. 60–64, Dec. 1993.*

Gribbin, W.J. "AvSat: an aeronautical satellite communications system" Communications, 1988. ICC '88. Digital Technology—Spanning the Universe. Conference Record., IEEE International Conference on, 1988, pp. 1112–1116 vol. 2, Jun. 1988.*

Lu, B.; Hu, W. "Air traffic control based on satellite" Systems, Man and Cybernetics, 1992., IEEE International Conference on, 1992, pp. 1163–1168 vol. 2, Oct. 1992.*

* cited by examiner

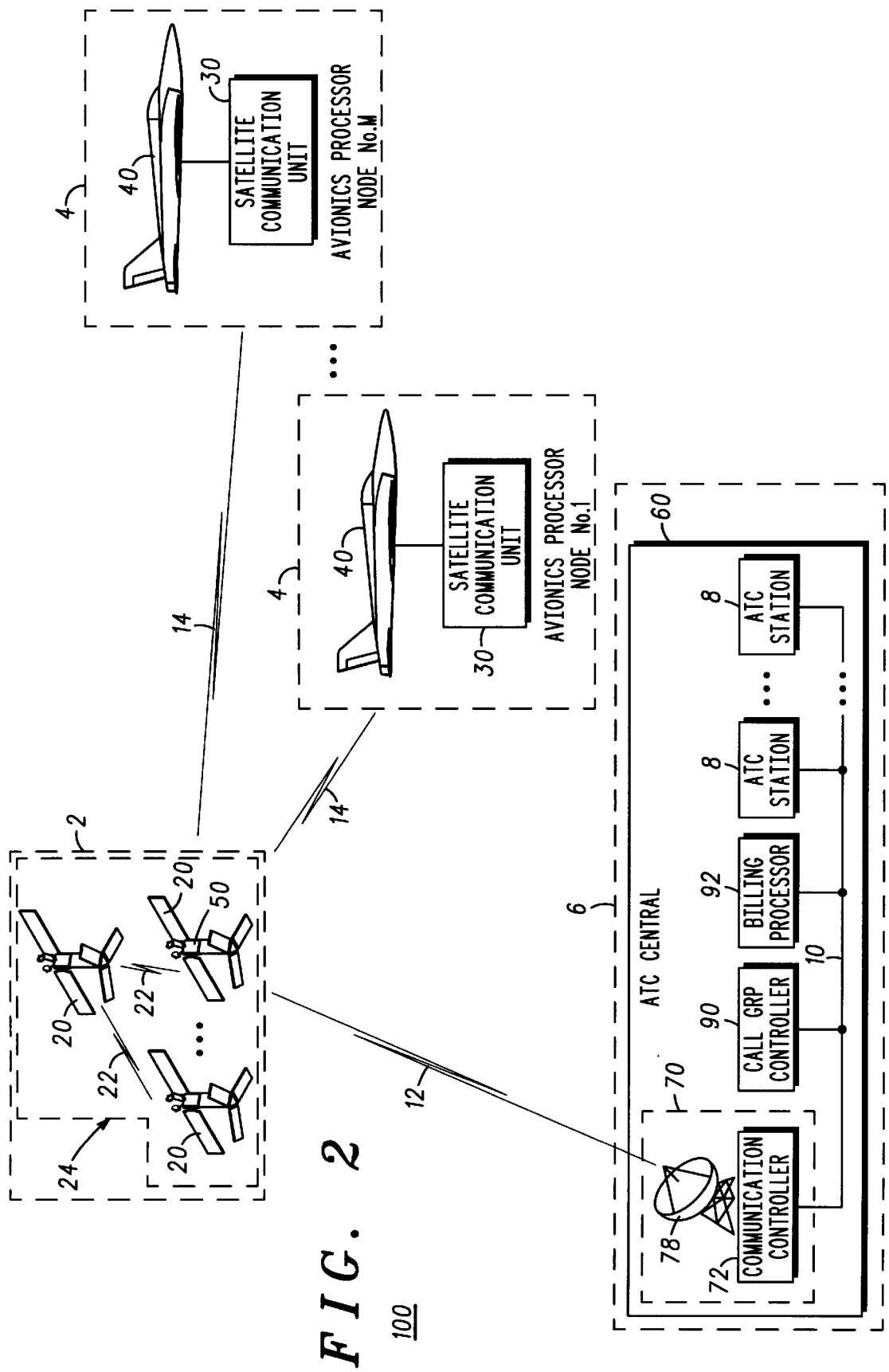

| VOICE CALL GROUP | AVAILABLE CITY | CONTROLLER ID/LOCATION | MEMBER ID'S |
|---|---|---|---|
| 1 | NO | — | —,—,—, |
| 2 | YES | — | —, |
| 3 | YES | — | —,— |
| ⋮ | | | |
| N | YES | — | |

SELECT DESIRED VOICE CALL GROUP

VOICE CALL GROUP 7: CONTROLLER A2714/PHOENIX

| MEMBER ID | NAME | FLIGHT | POSITION(LATITUDE/LONGITUDE/ALTITUDE |
|---|---|---|---|
| A2714 | CONTROL | — | — |
| AW4602217 | SMITH, J. | AW1552 | —/—/— |
| DE87223 | MILLER, F. | DE602 | —/—/— |
| ⋮ | | | |
| UA11431216 | ADAMS, B. | UA9723 | —/—/— |

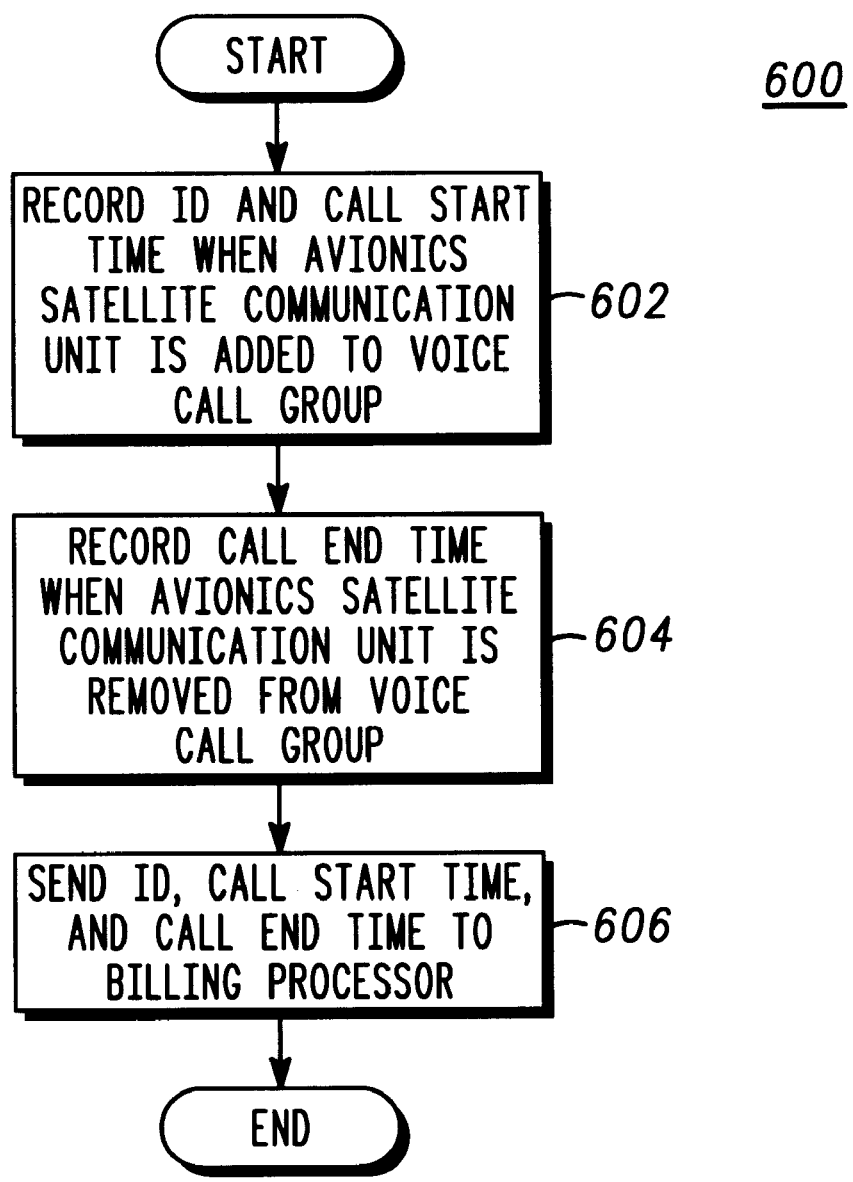

VOICE CALL GROUP FUNCTION FOR A SATELLITE BASED AIR TRAFFIC CONTROL SYSTEM

BACKGROUND OF THE INVENTION

The present invention relates generally to the field of aircraft communications, and more particularly to a system and method for providing voice call group functionality in a satellite based air traffic control system.

Air traffic control (ATC) systems control the airspace and airchannels between airports. Present day ATC systems utilize an air traffic communication infrastructure that has been in place since the 1950s. In the United States, this infrastructure includes more than 400 airport towers, 185 terminal radar approach control sites (Tracons), and 20 regional ATC centers. Voice communication between air traffic controllers and each aircraft remains, for the most part, entirely ground based. Airport towers communicate flight plans and instructions for take-off and landing to the aircraft while it is on the ground. Tracons monitor the aircraft and give flight instructions during take-off, approach and landing. Tracons typically monitor the aircraft up to 40 miles out of an airport in lower altitudes. Regional ATC centers take over control of the aircraft in high altitudes. Each regional ATC center maintains control over aircraft flying within its region, which may cover areas between 20 and 200 miles wide. As an aircraft enters or leaves the region of control of a regional ATC center, the regional ATC center communicates with either the Tracon site or the regional ATC center having control over the airspace from which the aircraft is entering or to which the aircraft is leaving to coordinate a hand-off of control of the aircraft. Tracon sites monitor aircraft within its airspace using airport surveillance radar (ASR), which typically has a range of approximately 55 nautical miles. Regional ATC centers monitor aircraft within their airspace using air route surveillance radar, which typically has a range of approximately 200 nautical miles.

Voice communication between air traffic controllers and aircraft is important for exchanging information such as route changes, weather and safety alerts, landing instructions, and information relating to crew or equipment emergency situations. Voice communication between a local airport control tower, a tracon site, or a regional ATC center and en route aircraft is provided in present day ATC systems using AM radio signaling. Typically, however, voice communication between a local airport control tower, a tracon site, or a regional ATC center ends when an aircraft leaves the airspace controlled by a respective ground control site. Thus, there is no seamless voice communication between a particular ground site and an airborne aircraft. Voice communication handoffs must be coordinated by the ground control site from whose airspace the aircraft is leaving and the ground control site into whose airspace the aircraft is entering. Handoffs are coordinated via ground line communications links such as ground telecommunications or microwave links.

Aircraft communication becomes even more complex when an aircraft crosses international borders. Each country or group of countries typically has its own ATC system and navigational infrastructure. This increases the complexity and therefore the reliability of ground-to-aircraft voice communication handoffs between different ATC systems. In addition, each ATC system may provide coverage of the entire country or group of countries, but more typically covers only a large part of it. Thus, some areas of some countries, and some areas between countries such as the airspace over oceans and the polar regions are uncovered. In uncovered areas, ground-to-aircraft communication may be slow and suffer more heavily from atmospheric interference, or may simply be unavailable.

Present day ATC communications systems have many disadvantages. First, present day ATC communications systems cannot provide seamless voice communication between a particular ATC tower, tracon or ATC center and an aircraft during the entire duration of its flight. Second, voice communication is not globally available. If an aircraft flies over an uncovered territory, all voice communication may be lost. Another disadvantage of current ATC communications systems is that radio communication signals over existing links are susceptible to atmospheric interference. Finally, because ATC systems are fragmented worldwide, a given aircraft does not maintain voice communication with any single ATC system during the entire duration of its flight.

Accordingly, a need exists for a method for maintaining voice communication between an aircraft and a ground air traffic control center for the entire duration of the aircraft's flight, if necessary, and thus independently of the location of the air traffic control center and the position of the aircraft. A need also exists for allowing a single air traffic controller or a pilot of an aircraft to simultaneously communicate with a group of pilots and or air traffic controllers.

BRIEF DESCRIPTION OF THE DRAWING

The invention will be better understood from a reading of the following detailed description taken in conjunction with the drawing in which like reference designators are used to designate like elements, and in which:

FIG. 2 is a block diagram of an air traffic control (ATC) system in which the voice call group function of the present invention may be implemented;

FIG. 13 is a flow chart of a method for determining time based billing costs for utilizing the services of an air traffic controller station.

DETAILED DESCRIPTION

The system and method of the present invention provides a reliable instantaneous voice call group function for a satellite based air traffic control system. The present invention provides a solution to the problems of current day ATC ground-to-aircraft communications systems at significant cost reduction by utilizing a low-orbit global-coverage satellite communications network to reduce infrastructure investment and complexity. The creation of a satellite based ATC communications system that provides voice call group functionality allows air traffic controllers to maintain voice communication with the pilot of an aircraft throughout the entire duration of its flight. The invention further allows pilots of other aircraft and ATC centers of different regions to listen in on and or join in the conversation. The present invention also provides a method for authenticating and identifying the voice generator to protect against unauthorized phantom controllers. Additionally, the use of a global-coverage satellite communications network in the present invention eliminates difficulties involved in communication hand-offs between regional ATC systems. Moreover, the satellite based ATC voice call group function of present invention allows voice data to be transmitted and received virtually error-free without susceptibility to atmospheric interference.

Figure 1:
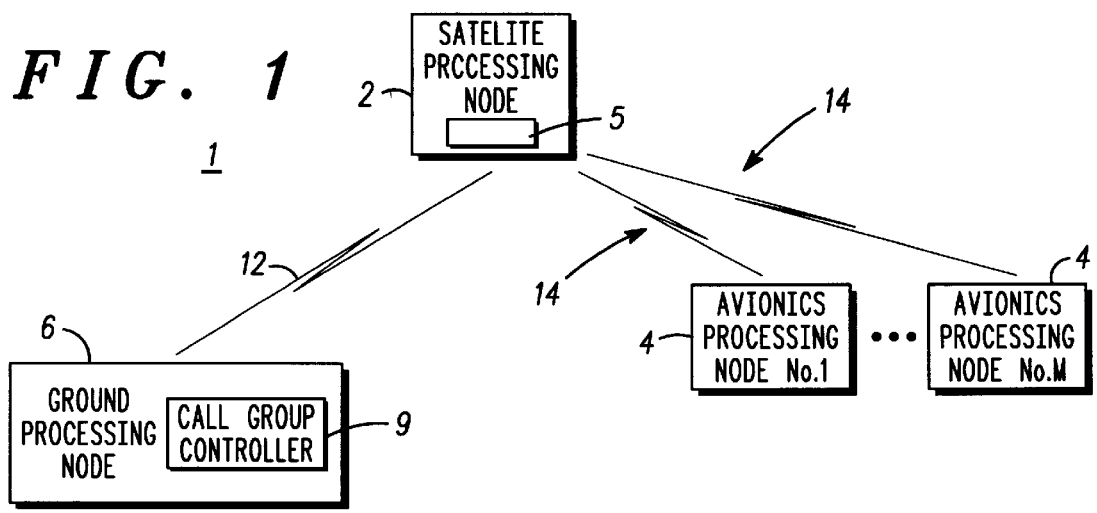
FIG. 1 is a block diagram of an air traffic control (ATC) communications network.

FIG. 1 is a diagram of an air traffic control (ATC) communications network, shown generally at 1. In accordance with the present invention, the ATC communication network 1 includes at least a satellite processing node 2, one or more avionics processing nodes 4, and a ground processing node 6. Satellite processing node 2 may comprise a plurality of sub-nodes, as for example a satellite communication network comprising a plurality of satellites in communication via inter-satellite links such as the IRIDIUM™ satellite communications network. Ground processing node 2 may also comprise a plurality of sub-nodes, as for example a local area network comprising a plurality of individual air traffic controller stations in communication with each other and each sharing a common satellite ground link 12 for communication with satellite processing node 2.

Voice signals may be passed between satellite processing node 2 and any one or more of a group of M avionics processing nodes 4 over satellite communication links 14. Similarly, voice signals may be passed between satellite processing node 2 and ground processing node 6 over a satellite ground link 12. Voice signals may be sent between ground processing node 6 and one or more of the M avionics processing nodes 4 through satellite processing node 2. Thus voice signals sent from ground processing node 6 may be transmitted over satellite ground link 12 to satellite processing node 2, and then over one of the satellite communication links 14 to one or more of the avionics processing nodes 4. Likewise, voice signals sent from an avionics processing node 4 may be transmitted over a satellite communication link 14 to satellite processing node 2, and then over satellite ground link 12 to ground processing node 6. Voice signals may also be transmitted between different ones of the avionics processing nodes 4 by routing the voice signals through satellite processing node 2. For example, voice signals sent from the first avionics processing node 4 to the Mth avionics processing node 4 are transmitted over a first satellite communication link 14 to satellite processing node 2, and then over the same or a different satellite communication link 14 to the Mth avionics processing node 4.

Satellite ground link 12 comprises at least one group communication channel, and preferably multiple group communication channels. In the embodiment shown, multiple group communication channels are provided by using any one of a number of multiple access protocols which include, but are not limited to, time division multiple access (TDMA), code division multiple access (CDMA), random division multiple access (RDMA), or a combination of such schemes. TDMA is a well known data transmission scheme in which a communication channel is divided into a plurality of time slots and in this case being the preferred embodiment of this system. In this preferred embodiment, each time slot may be assigned to a different voice call group. Each satellite communication link 14 also comprises at least one group communication channel, and preferably multiple group communication channels using the TDMA scheme as described above.

The frequency and time slot of a given voice call group may very likely be different over channels in different links. For example, a voice call group may be assigned to one time slot in one group communication channel over satellite ground link 12 and to a completely different time slot and different group communication channel over a satellite communication link 14. Accordingly, the satellite processing node 2 includes a communication controller 5 which operates to route voice signals between a group communication channel in satellite ground link 12 assigned to a particular voice group call to the corresponding group communication channel in a satellite communication link 14 assigned to the same voice group call.

The ATC communication network 1 also includes a call group controller 9 which manages the assignments of available group communications channels in satellite ground link 12 and satellite communication links 14 to each voice call group. Each voice call group requires a group communications channel in satellite ground link 12 and a group communications channel in one or more satellite communication links 14. Call group controller 9 keeps track of available group channels in the satellite ground link 12 and each of the satellite communication links 14 which may be assigned to new voice call groups. Call group controller 9 also monitors membership in each established voice call group, and may also be configured to grant or deny membership in various voice call groups. In the embodiment shown, call group controller 9 is implemented at ground processing node 6. However, call group controller 9 may alternatively be implemented at satellite processing node 2. Moreover, the functionality of the call group controller 9 may be fragmented and partially implemented at both the satellite processing node 2 and ground processing node 6.

FIG. 2 is a block diagram of an air traffic control (ATC) system 100 in which the voice call group function of the present invention may be implemented. In the embodiment shown, ground processing node 6 comprises an air traffic control (ATC) center 60. ATC center 60 comprises a call group controller 90 and a plurality of air traffic controller (ATC) stations, each shown identically at 8. Call group controller 90 and ATC stations 8 are configured to share a satellite ground link 12 over which voice signals are sent and received. Accordingly, ATC center 60 in the embodiment shown also includes a satellite gateway 70. Satellite gateway 70 includes a communications controller 72 for managing channel synchronization and access, and a transceiver 78 for transmitting and receiving signals over satellite ground link 12. Each ATC station 8 is configured to send and receive voice signals to and from satellite gateway 70 over a local communication link 10. Call group controller 90 is configured to send and receive control and data messages to and from each of the ATC stations 8 and the satellite gateway 70 over local communication link 10. The control and data messages generated by and received by call group controller 90 may include, by way of example, channel access requests/grants, group communication channel availability, and authentication/identifier information. Call group controller 90 may be implemented using any conventional processor executing a call group control program in accordance with the desired functionality of such a program. Local communication link 10 may be implemented using any conventional optical, wired or wireless communication system. Each ATC station 8 is also preferably assigned to a particular voice call group, and is thus typically connected to its assigned group communication channel.

In ATC system 100, satellite processing node 2 is preferably implemented with a satellite communications network 24 comprising a plurality of satellites, each identically shown at 20, in communication via inter-satellite links 22. Preferably, each satellite 20 includes a communications controller 50 which operates to route voice and data signals between corresponding group communication channels of different communication links 12, 14, 22 that are assigned to the same voice group call.

As also shown in FIG. 2, ATC system 100 includes a plurality of avionics processing nodes 4. Each avionics processing node 4 in the embodiment shown comprises an avionics satellite communications unit 30 aboard an aircraft 40.

Figure 3:
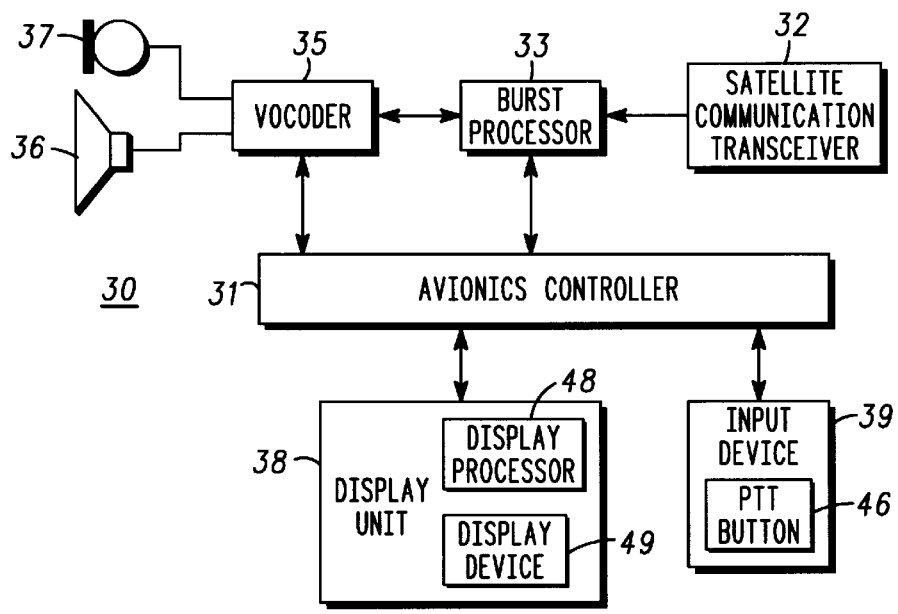
FIG. 3 is a block diagram of an avionics satellite communication unit in accordance with the invention.

FIG. 3 is a block diagram of a preferred embodiment avionics satellite communication unit 30. As shown in FIG. 3, the avionics satellite communication unit 30 preferably includes a satellite communications transceiver 32, a burst processor 33, a vocoder 35, a speaker 36, a microphone 37, an avionics unit controller 31, and a display unit 38 and input device 39. Satellite communications transceiver 32, which may be implemented with any transceiver having the capability to send and receive signals to and from a satellite 20 (e.g., a Motorola LST5 manufactured by Motorola, Inc.), receives an incoming signal from a satellite 20. Satellite communications transceiver 32 demodulates the actual incoming signal from the carrier signal. Burst processor 33 synchronizes the actual incoming signal into frames to extract digital packets. The avionics unit controller 31 removes the header information, determines what type of message is contained in the digital packet, and extracts the message. If the message is a voice message, avionics unit controller 31 sends the voice message to vocoder 35 where it is converted into an analog voice signal and output by speaker 36. If the message is a data message, avionics unit controller 31 processes the data message, and outputs any updates to display unit 38 when appropriate.

Figure 4:
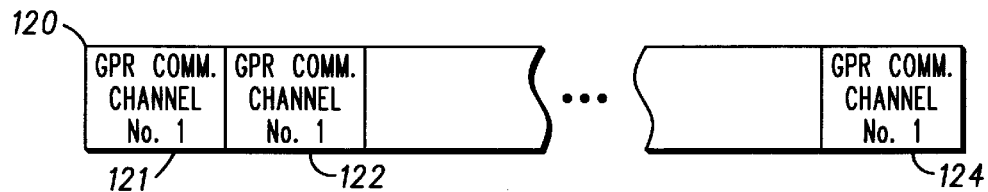
FIG. 4 is a diagram illustrating a TDMA time slice of a communications channel.

FIG. 4 is a diagram illustrating a time slice 120 of a preferred TDMA embodiment of a single channel of any or all of links 10, 12, and 14 of FIG. 2. As shown, a single channel may be divided into N time slots, shown at 121–124 to support N group communication channels for N independent voice call groups. The number of slots N is typically determined by the bandwidth of the channel 120 and the minimum bandwidth required to transmit a single digital packet containing enough information to support voice communication across the channel.

Figure 5:
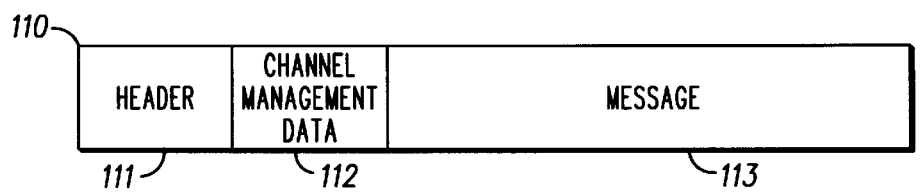
FIG. 5 is a diagram illustrating a preferred embodiment digital packet used to carry a digitized voice or digital data message.

FIG. 5 illustrates a preferred embodiment of a digital packet used to carry a digitized voice or digital data message. As shown in FIG. 5, the digital packet, shown at 110, includes a header field 111, a channel management field 112, and a message body 113. The header field 111 contains information including routing information such as a source node identifier, a destination node identifier, a message type, and other pertinent information. The channel management field includes link control information such as the voice call group identifier used by the call group controller 90 for translating channels between different communication links. Message body 113 contains either voice or data. Header field 111 preferably contains a message type indicator. Thus, as shown in FIG. 3, when a digitized packet is extracted from an incoming signal by burst processor 33, avionics unit controller 31 determines the message type from the header field 111. If the message type is a voice message, the message body 113 is sent to vocoder 35 for output by speaker 36. If the message type is a data message (e.g., control information such as the granting of a channel access request by the call group controller 90 of the communications channel network, or display information), the message body 113 is processed by the avionics controller 31 and/or sent to an appropriate entity for processing.

Once an aircraft 40 is assigned to a voice call group on a communications channel, the pilot of the aircraft 40 preferably remains mainly in a receive or "listening" mode. Occasionally, the pilot must join the conversation, or enter a "talk" mode. In this case, the pilot speaks into microphone 37 which converts the speech into an analog voice signal. The analog voice signal is sent through vocoder 35 where it is converted to a digitized voice message. The avionics unit controller 31 packetizes the digitized voice message and adds header information to create a digital packet. The digital packet is sent to burst processor 33, where it is queued and any necessary link control information is added to it. Burst processor 33 waits for its assigned user timeslot, and then sends the digitized packet to the satellite communications transceiver 32 for transmission over its assigned group communications channel.

In one embodiment of the invention, each voice call group includes two channel timeslots in its assigned group communication channel over each link. In this embodiment, one timeslot is used as a dedicated controller uplink to allow the controller to speak at any time and always be heard by the other members of the same voice call group. The other timeslot is a conference bridge over which any and all voice call group members may both speak and listen.

To avoid voice "collisions" when more than one pilot attempts to talk over a group communication channel simultaneously, a "talk" protocol is implemented in the voice call group function of the invention. This "talk" protocol is preferably implemented using a "push-to-talk" function that emulates the present day communications protocol that is implemented in line-of-site AM radio communication systems. Under this protocol, a pilot member of a voice call group acquires permission to talk over the group communications channel assigned to the voice call group by pressing a "push to talk" button, shown in FIG. 3 at 46.

Figure 6:
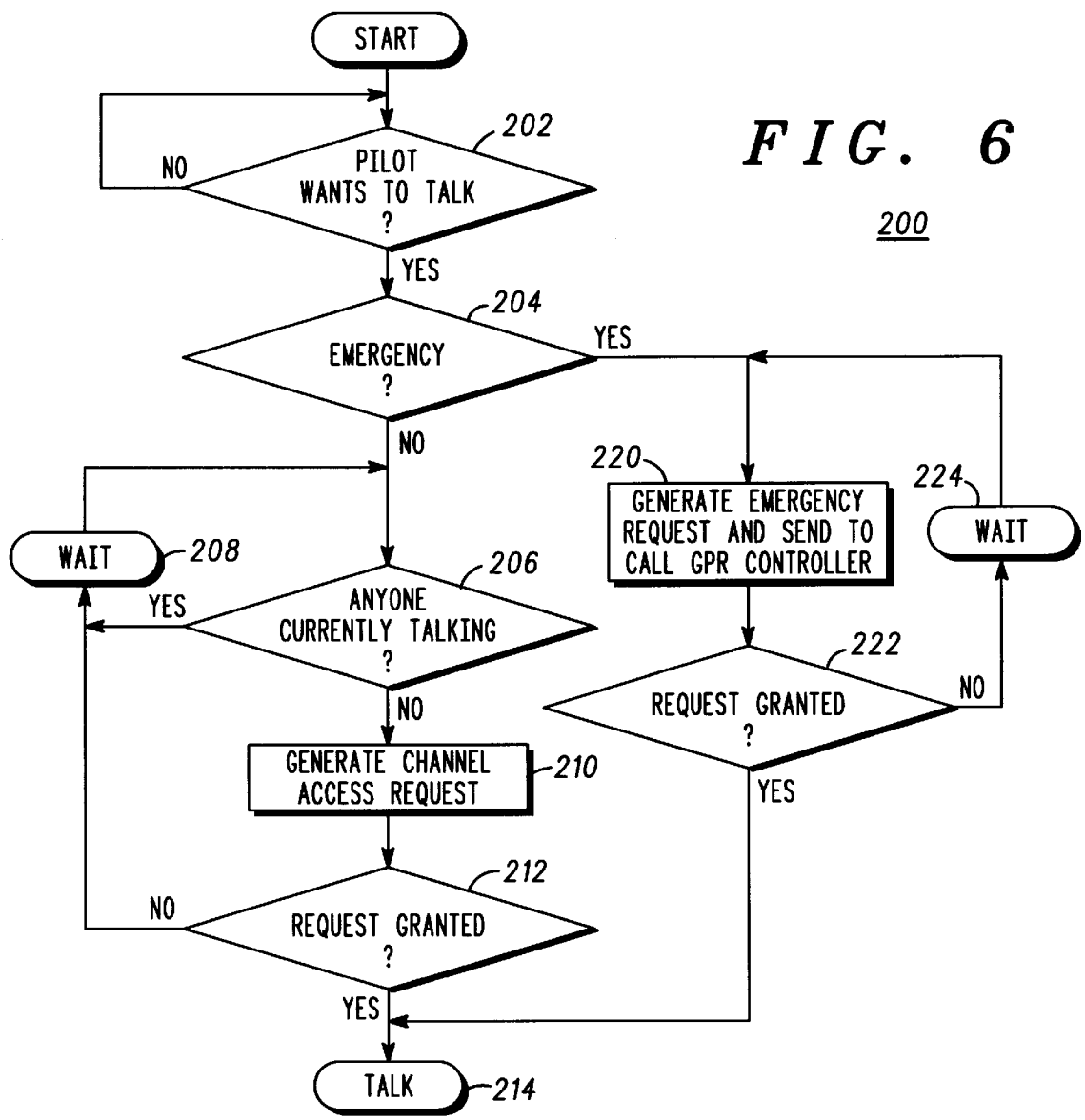
FIG. 6 is a flow chart illustrating a preferred embodiment implementation of a "push to talk" function used by members of a voice call group.

FIG. 6 is a flow chart illustrating a preferred embodiment implementation of a "push to talk" function. The method, shown generally at 200, of the "push to talk" function includes a first step 202 of determining whether the pilot wants to talk. As described previously, a pilot preferably remains in a listening mode unless and until the pilot has relevant and important information to convey via voice. Accordingly, while the pilot is in listening mode, the method remains in step 202. When it becomes necessary for the pilot to talk, the determination of whether an emergency exists is made in a step 204. If no emergency exists, the pilot determines whether anyone is currently talking over the group communication channel in a step 206. This is typically determined by listening to the channel to determine if anyone is currently speaking. If the channel is currently being accessed by another user, the pilot waits in a step 208 until nobody is talking over the channel. Once it has been determined that no one is talking over the group communication channel assigned to the voice call group, the pilot generates a channel access request in step 210, preferably by pressing a "push to talk" button 46. When the channel access request 210 is generated, the avionics satellite communication unit 30 in the pilot's aircraft 40 waits to see whether the request was granted in step 212. If the request was not granted, the pilot then waits in a step 208, and then repeats steps 206 through 212. Once the request is granted, the pilot may then talk over the group communication channel in a step 214 by speaking into a microphone, as shown at 37 in FIG. 3.

Steps 202 through 214 may be followed in most circumstances. However, occasionally, an emergency condition exists and a pilot will need talk over the voice group channel immediately. In this case, it will be determined in step 204 that an emergency does exist. The pilot then generates an emergency access request in a step 220, which is sent to the call group controller 90 (see FIG. 3) controlling the group communications channel assigned to the voice call group. The call group controller 90 preferably detects the high priority of the emergency access request and grants the emergency access request as long as no other message has higher priority. Preferably, the call group controller 90 signals to each member of the voice group call that an emergency exists and to clear the channel. The determination of whether the emergency access request is granted is made in step 222. If the emergency access request has not been granted, the pilot must wait in a step 224 and then repeat steps 220 through 224. Once the emergency access request has been granted, the pilot may then talk over the channel in step 214. As mentioned previously, the communications protocol employed in the preferred embodiment is preferably designed to emulate the current "push to talk" protocol used in present day line of sight AM radio frequency systems. However, it will be clear to those skilled in the art that the "push to talk" function may be implemented using a variety of other methods, implementations, and protocols. Accordingly, any method, implementation, or set of communication protocols which achieves the desired "push to talk" functionality is incorporated herein.

Referring once again to FIG. 2, call group controller 90 maintains a voice call group register for recording each group communication channel, assigned voice call group, current voice call group member IDs, corresponding call start time of each voice call group member, and other such relevant information from which channel availability and usage may be derived. Call group controller 90 causes information contained in or derived from the voice call group register to be broadcast over the satellite communications links 14 and satellite ground link 12. Avionic satellite communication units 30 of each aircraft 40 and ATC stations 8 receive this information. In a first embodiment, this information may be broadcast continuously over a designated channel in each link 12, 14. Alternatively, the information may be sent as a burst packet interleaved with voice message packets over each group communication channel. In this case, the burst packets must be interleaved at a low enough rate so as not to degrade the quality of the reconstructed voice signal as heard by the pilots and controllers. Preferably, the information contained in the burst packets or over a designated channel are transmitted in digital packet format similar to that used for transmitting digitized voice messages. In the avionics satellite communication device 30 of FIG. 3, these packets are received by the satellite communication transceiver 32, extracted by burst processor 33, and routed to display unit 38. Display unit 38 preferably comprises a display processor 48 which processes the information from the call group controller 90 and suitably displays it on a display device 49. ATC stations 8 at the ATC center 60 similarly receive, process and display the information from the call group controller 90.

Figures 7, 8, 9:
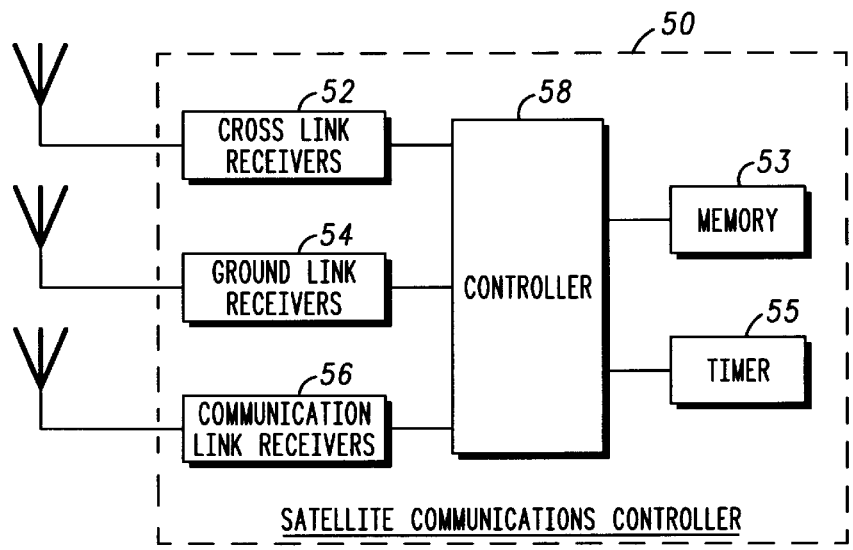
FIG. 7 is an example display which may be displayed before a pilot is assigned to a voice call group.
FIG. 8 is an example display screen which may be displayed after a pilot or aircraft has been assigned to a voice call group.
FIG. 9 illustrates a block diagram of satellite communications controller.

FIGS. 7 and 8 are examples of one embodiment of the displays illustrating the type of information that may be collected and transmitted by call group controller 90 and formatted for display for air crew members and ATC staff. FIG. 7 is an example display which may appear before an air crew member is assigned to a voice call group. In this case, the air crew member may be presented with a menu of voice call groups, including the current availability for each voice call group, the ID and/or location of each voice call group's assigned controller, and the IDs of current users assigned to each voice call group. The screen shown in FIG. 7 allows an air crew member to select an available voice call group by entering the channel number corresponding to the requested voice call group. The call group controller 90 receives the request and either grants or denies the request. Reasons for denying the voice call group access request may include, for example, an improper authentication of the requesting air crew member or aircraft.

FIG. 8 is an example display screen which may be displayed after an aircraft has been assigned to a voice call group. As shown in FIG. 8, this display screen displays voice call group specific information such as the member ID, registered member information such as the pilot's name, airline, flight number, any relevant navigation information, and who is currently speaking on the channel. In FIG. 8 the current speaker is indicated with an asterisk before the user ID.

As previously described, a particular voice call group that requires communication over more than one link 12, 14 may be assigned to different channel frequencies and/or time slots in each independent link 12, 14. Accordingly, satellite processing node 2 is preferably provided with communications controller 50 which manages the routing of signals from one link to another. A similarly functioning communications controller may be implemented at any communications network node through which signals are routed from one communication link to another. FIG. 9 illustrates a block diagram of satellite communications controller 50 for a member satellite 20 of a satellite communications network 24 implemented at satellite processing node 2. As shown in FIG. 9, satellite communications controller 50 preferably includes a set of inter-satellite crosslink transceivers 52, a set of satellite ground link transceivers 54 and a set of satellite communication link transceivers 56. Each of these transceivers are controlled by a controller 58. A memory 53 is provided for storing voice call group channel and slot assignments and inter-link mappings. Controller 58 uses the assignments and mappings stored in memory 53 to route signals received over a given channel and time slot of one link to its corresponding voice call group assigned channel and time slot of another link. Communication controller 50 also preferably includes timer 55 for use in synchronizing time slot frames when transmitting and receiving signals over transceivers 52, 54, 56. Data transmission protocols and synchronization schemes are known in the art and any suitable implementation is hereby incorporated herein.

Figure 10:
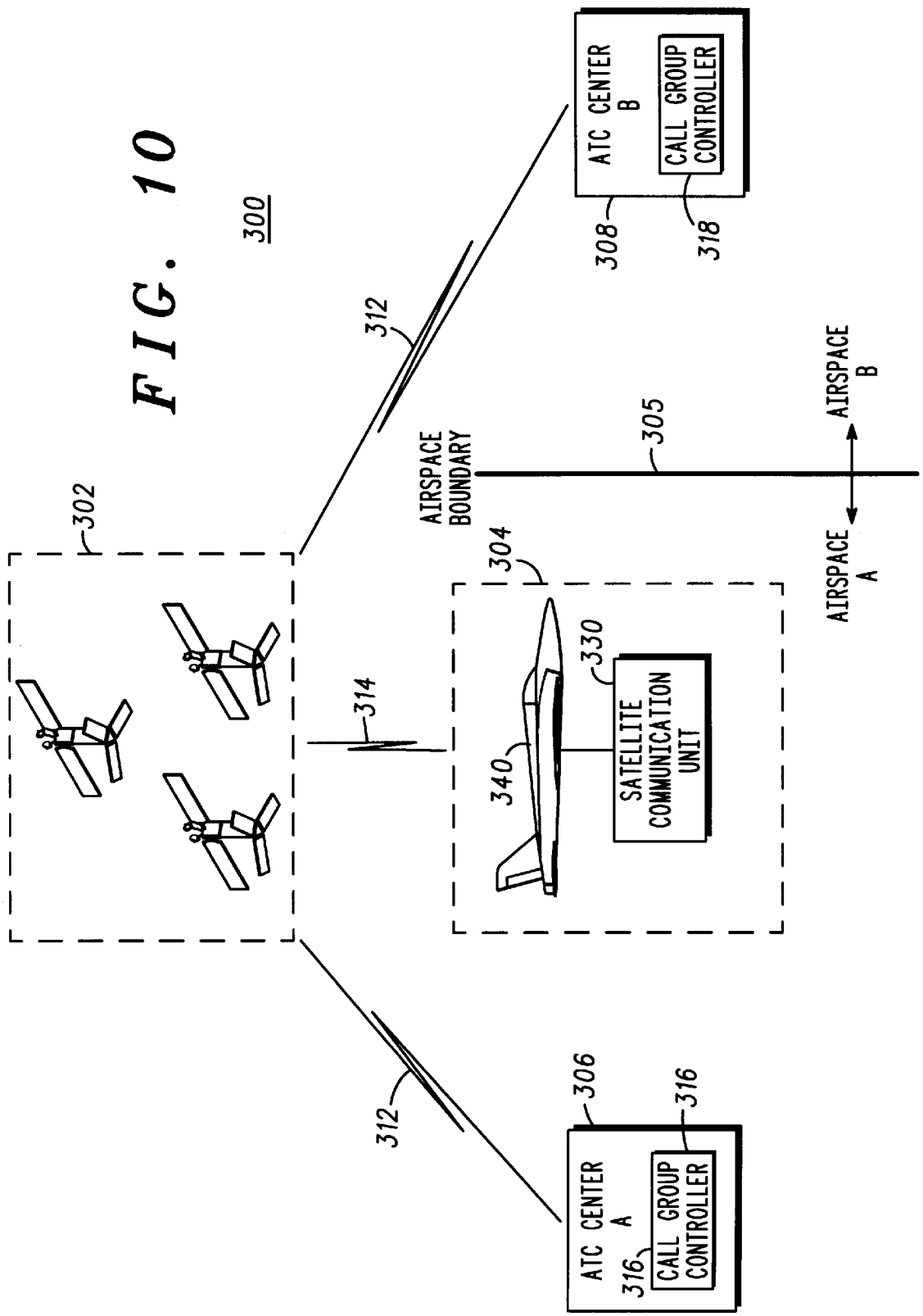
FIG. 10 is a block diagram of an ATC system illustrating two different regions of airspace under the control of two different ATC centers.
Figure 11:
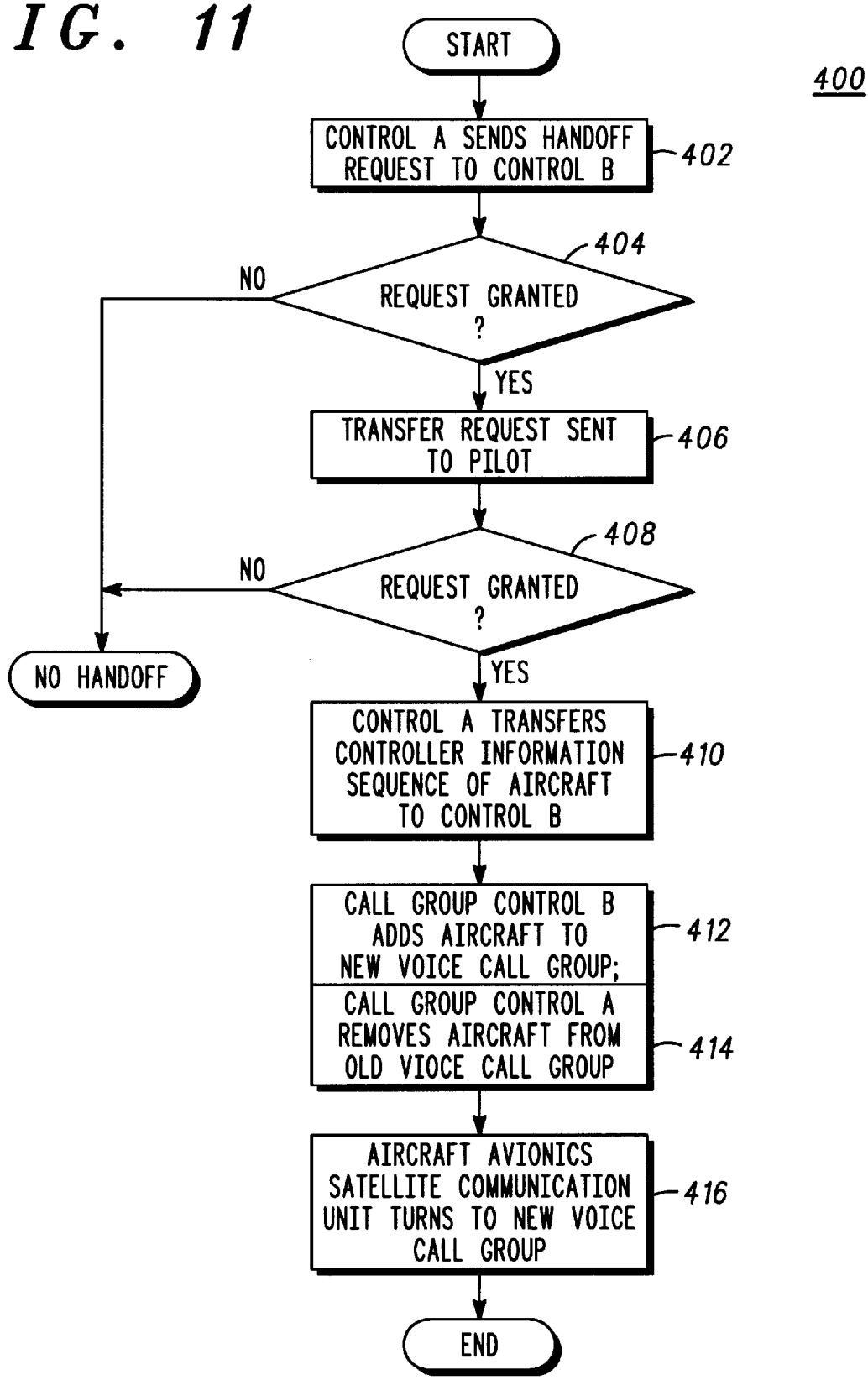
FIG. 11 is a flow chart of a method for performing a communication handoff.

In present day air traffic control systems, regional air traffic controllers are stationed at fixed locations relative to the ground and spaced out across different geographical regions. Regional air traffic control centers thus typically provide control over and manage the airspace over a specific geographical region. FIG. 10 is a block diagram of an ATC system 300 illustrating two different regions of airspace, AIRSPACE A and AIRSPACE B, each under the control of a different ATC center, shown respectively at 306 and 308. Each ATC center 306 and 308 include respective call group controllers 316 and 318 for managing voice call groups. An aircraft 340 provided with an avionics satellite communications unit 330 is preferably a member of a voice call group under the control of a call group controller 316 at ATC center A while it is within the regional airspace of AIRSPACE A. With the present invention it is possible for a given air traffic controller to maintain voice communication with a given aircraft for the entire duration of the aircraft's flight. This is especially true when the satellite processing node 2 of FIGS. 1 and 2, and 302 of FIG. 10, is implemented using a global coverage satellite communication network such as the IRIDIUM™ satellite communications system developed by Motorola, Inc. in Chandler, Ariz. However, in the interest of efficiency, costs and airspace sovereignty, this feature may not always be desirable. Thus, when aircraft 340 approaches airspace boundary 305, it may be desirable to perform a handoff of communications with aircraft 340 from a controller at ATC center 306 to a controller at ATC center 308. FIG. 11 is a flow chart of a method for performing a communication handoff. The method, shown at 400, includes a first step 402 where a controller A at ATC center 306 in FIG. 10 sends a handoff request to a controller B at ATC center 308. Controller B either accepts or rejects the request in step 404. If the handoff request was rejected, then no communication handoff takes place from controller A to controller B. If controller B accepts the handoff request, controller A or controller B, depending on the implementation, sends a transfer handoff request to the pilot of aircraft 340 in a step 406. In the preferred embodiment, the pilot has the option of accepting or rejecting the transfer. The pilot accepts or rejects the transfer handoff request in step 408. If the handoff transfer request is rejected, in the preferred embodiment, no handoff transfer will take place. If the handoff transfer request was accepted, controller A transfers all necessary control sequence information of aircraft 340 to controller B in a step 410. In a step 412 call group controller 318 adds aircraft 340 to a new voice call group under its control. Call group controller 316 also removes aircraft 340 from its original voice call group managed by call group controller 316. In a step 416, the aircraft avionics satellite communications unit tunes the avionic satellite communication unit 330 of aircraft 340 to the group communication channel assigned to its new voice call group managed by call group controller 318.

In the method 400 of FIG. 11, each of controller A, controller B and the pilot have the option to accept or reject hand off requests. In certain circumstances, however, it may be desirable not to give either the pilot or controller B the option of rejecting the request. Accordingly, the communication handoff method may be implemented differently to accommodate the requirements of the ATC system's handoff protocol.

Figure 12:
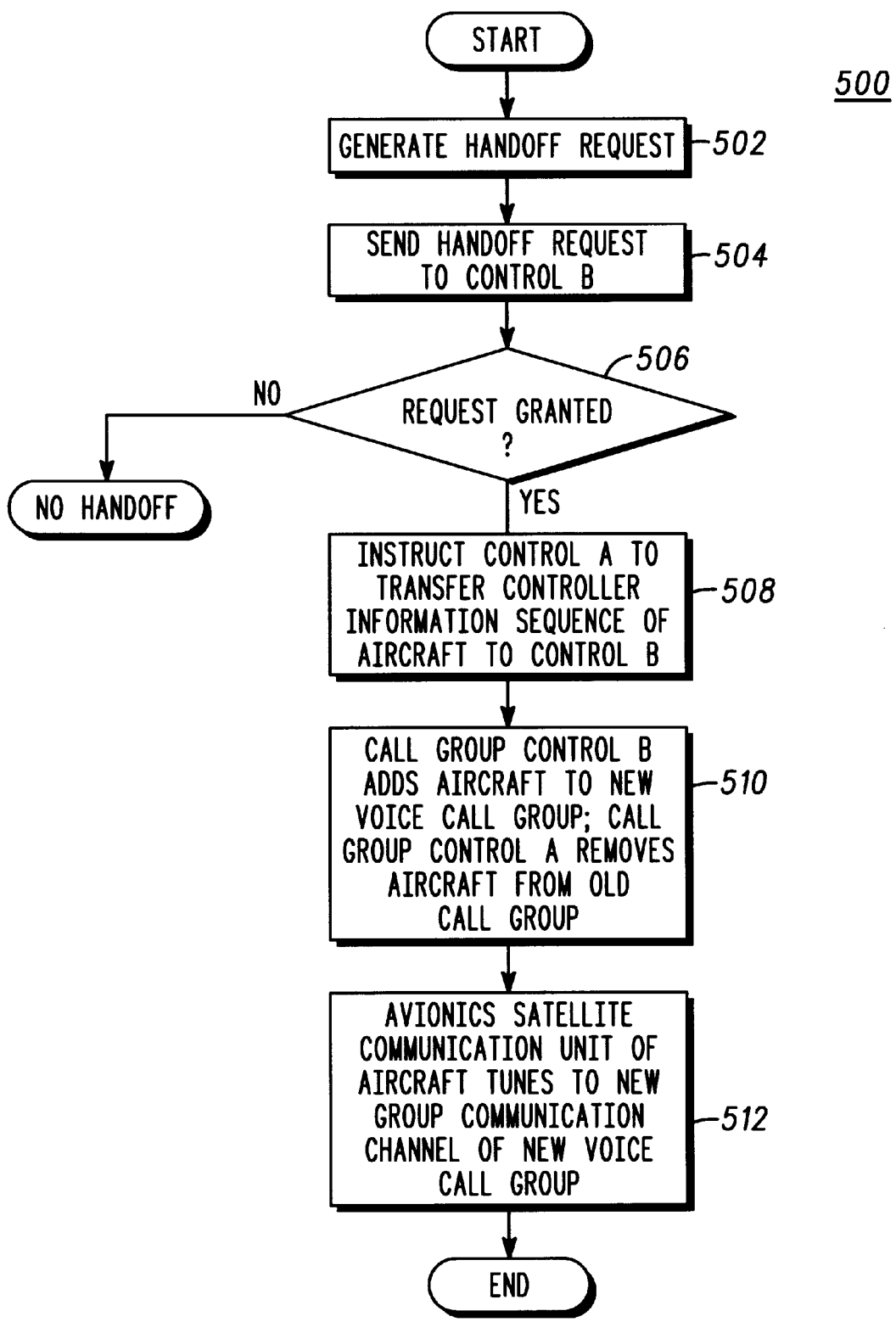
FIG. 12 is a flow chart illustrating a method of a communication handoff initiated by either the pilot or the avionics satellite communication unit of an aircraft.

FIG. 12 is a flow chart illustrating a method, shown at 500, of a communication handoff initiated by either the pilot or the avionics satellite communication unit 330 of aircraft 340 of FIG. 10. A typical scenario in which a communication handoff may be initiated by a pilot is when the aircraft is approaching a geographical border, such as airspace boundary 305 shown in FIG. 10. According to method 500, a handoff is initiated by generating a handoff request in a step 502. The handoff request is sent to the requested controller (controller B) in a step 504. In a step 506 controller B either grants or denies the handoff request. If the handoff request is not granted, no handoff occurs and aircraft 340 remains in its original voice call group. If the handoff request is granted, the avionic satellite communication unit 330 instructs, in a step 508, original controller A to transfer all control sequence information of the aircraft 340 to controller B. In a step 510, call group controller 318 adds aircraft 340 to a new voice call group. In a step 512, call group controller 316 removes aircraft 340 from its original voice call group. In step 514, avionic satellite communication unit 330 of aircraft 340 tunes to the new voice call group.

A given call group controller may be implemented to collect billing information. FIG. 13 is a flow chart of a method, shown at 600, for determining time based billing costs for utilizing the services of an air traffic controller station. As shown in FIG. 13, the call group controller records the avionics satellite communications unit ID and the call start time at the time that the aircraft is added to a voice call group in step 602. In a step 604, the call group controller records the call end time when it removes an avionics satellite communication unit from the voice call group. In a step 606, the call group controller sends the avionic satellite communication ID and call start and end times to a billing processor 92 (see FIG. 2). The billing processor 92 may determine the duration of the call from the start and end times and associate a charge with the corresponding avionic satellite communication ID of the aircraft. Other billing algorithms may also be used to determine user fees, such as position of aircraft/length of time in a given airspace, number of data packets transferred, or length of time the push to talk function is utilized.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A satellite based voice call group function for an air traffic control system, comprising:

a satellite communications network at a satellite processing node;

a plurality of avionics processing nodes, each comprising an avionics satellite communication unit aboard an aircraft for communicating with said satellite communications network over a satellite communication link, said satellite communication link comprising at least one first group communication channels;

an air traffic control station at an air traffic control processing node, said air traffic control station in communication with said satellite communications network over a satellite ground link, said satellite ground link comprising at least one second group communication channels;

a call group controller for assigning voice call group assigned channel to a common voice call group, said voice call group assigned channels comprising selected ones of said first group communication channels and selected ones of said second group communication channels, wherein said voice call group assigned channels includes a dedicated uplink to allow said air traffic control station to speak at any time and always be heard by each of the other members of said common voice call group;

a communication controller which operates to route voice and data signals over and between said voice call group assigned channels, said data signals including information describing relevant navigation information for each member of said common voice call group; and said satellite communications network comprises a plurality of satellites which communicate with each other over inter-satellite links.

2. The system of claim 1, wherein:

selected ones of said aircraft join said common voice call group by accessing at least one of said selected ones of said first group communication channels.

3. The system of claim 2, wherein:

said call group controller is configured to maintain a register for recording an aircraft ID for each of said selected ones of said aircraft that joins said common voice call group.

4. The system of claim 3, wherein:

said call group controller records a call start time and a call end time for each of selected ones of said aircraft, said call start time indicating a time at which said corresponding selected one of said aircraft joins said common voice call group, and said call end time indicating a time at which said corresponding selected one of said aircraft exits said common voice call group.

5. The system of claim 4, comprising:

a billing processor for receiving each aircraft ID and associated call start time and call end time, said billing processor for calculating a call duration and associating a charge for said call duration to be attributed to said aircraft identified by said aircraft ID.

6. The system of claim 2, wherein:

said selected ones of said aircraft that have joined said common voice call group transmit voice signals over said voice call group assigned channels according to a push-to-talk protocol.

7. The system of claim 6 wherein said push-to-talk protocol includes the steps of:

waiting for silence on said voice call group assigned channels;

sending a channel access request to said call group controller requesting permission to transmit over said voice call group assigned channels;

waiting for said channel access request to be granted; and transmitting voice signals over said voice call group assigned channels.

8. The system of claim 7, wherein:

said step of requesting access to speak over said voice call group assigned channels comprises the step of pressing a push-to-talk button, said push-to-talk button generating said channel access request when pressed.

9. The system of claim 1, wherein:

said air traffic control station joins said common voice call group by accessing at least one of said selected ones of said second group communication channels.

10. The system of claim 1, wherein:

said selected ones of said second group communication channels comprises an uplink channel reserved for the transmission of air traffic control (ATC) voice signals via said air traffic control station; and said selected ones of said first group communication channels comprises an downlink channel over which said ATC voice signals are routed, said downlink channel reserved for listening only by avionics members comprising selected ones of said avionics satellite communication units that have joined said common voice call group by accessing said selected ones of said first group communication channels.

11. The system of claim 10, wherein:

said selected ones of said first group communication channels comprises a designated first talk channel over which each of said avionics members may transmit and receive traffic voice signals; and said selected ones of said second group communication channels comprises a designated second talk channel over which said traffic voice signals may be received by said air traffic control station.

12. The system of claim 1, wherein:

said call group controller control is configured to allow or disallow each of said aircraft to join said common voice call group.

13. The system of claim 1, wherein:

said call group controller is implemented at said air traffic control processing node.

14. The system of claim 1, wherein:

said call group controller is implemented at said satellite processing node.

15. The system of claim 1, wherein:

said satellite communications network comprises a satellite.

16. The system of claim 1, wherein:

said satellite communication network provides global communication coverage.

17. The system of claim 1, wherein:

said first group communication channels are implemented using a multiple access transmission protocol.

18. The system of claim 1, wherein:

said second group communication channels are implemented using a multiple access transmission protocol.

19. A method for providing voice group call functionality in a satellite based air traffic control (ATC) system, said ATC system comprising a satellite communications network, a plurality of aircraft each comprising an avionics satellite communication unit for communicating with said satellite communications network, and an air traffic control station, said method comprising the steps of:

establishing a satellite communication link for transmitting voice signals between said satellite communications network and selected ones of said plurality of aircraft, said satellite communication link comprising at least one first group communication channels;

establishing a satellite ground link for transmitting voice signals between said satellite communications network and said air traffic control station, said satellite ground link comprising at least one second group communication channels;

assigning voice call group assigned channels to a common voice call group, said voice call group assigned channels comprising selected ones of said first group communication channels and selected ones of said second group communication channels, wherein said step of assigning voice call group assigned channels to a common voice call group includes the step of establishing a dedicated uplink to allow said air traffic control system to speak at any time and always be heard by each of the other members of said common voice call group;

routing voice and data signals over and between said voice call group assigned channels, said data signals including information describing relevant navigation information for each member of said common voice call group; and said activity of establishing a satellite communication link including an activity of communication via inter-satellite links among a plurality of satellites of said satellite communication network.

20. The method of claim 19, further comprising the step of:

allowing selected ones of said aircraft to become members of said common voice call group, said members joining said common voice call group by accessing at least one of said selected ones of said first group communication channels.

21. The method of claim 20, further comprising the steps of:

maintaining a record for each of said members, said record comprising a member ID corresponding to said respective member, a call start time indicating a time at which said respective member joins said common voice call group, and a call end time when said member exits said common voice call group.

22. The method of claim 21, further comprising the steps of:

calculating a voice call group duration from said call start time and said call end time associated with a member ID; and associating a charge for said voice call group duration to be attributed to an entity identified by said member ID.

23. The method of claim 22, wherein said members of said common voice call group follow a push-to-talk protocol for transmitting voice signals over said voice call group assigned channels, said protocol comprising the steps of:

waiting for silence on said voice call group assigned channels;

sending a channel access request to said call group controller requesting permission to transmit over said voice call group assigned channels;

waiting for said channel access request to be granted; and transmitting voice signals over said voice call group assigned channels.

24. The method of claim 23, wherein said step of requesting access to speak over said voice call group assigned channels comprises the step of:

pressing a push-to-talk button, said push-to-talk button generating said channel access request when pressed.

25. The system of claim 19, further comprising the step of:

allowing said aircraft control station to become a member of said common voice call group, said member joining said common voice call group by accessing at least one of said selected ones of said second group communication channels.

* * * * *